United States Patent [19]
Guay

[11] Patent Number: 5,366,264
[45] Date of Patent: Nov. 22, 1994

[54] RAM BAR ATTACHMENT FOR VEHICLE BUMPER

[75] Inventor: André Guay, Dubreuilville, Canada

[73] Assignee: Guay's Enterprises Ltd., Dubreuilville, Canada

[21] Appl. No.: 131,311

[22] Filed: Oct. 4, 1993

[30] Foreign Application Priority Data

May 11, 1993 [GB] United Kingdom ............ 930961407

[51] Int. Cl.⁵ .................. B60R 19/16; B60R 19/54
[52] U.S. Cl. .................... 293/125; 293/17; 293/49; 293/DIG. 1
[58] Field of Search .......... 293/17, 49, 125, 102, 293/145, DIG. 1; 280/481

[56] References Cited

U.S. PATENT DOCUMENTS

| | | | |
|---|---|---|---|
| 653,930 | 7/1900 | Von Holt | 293/49 |
| 815,928 | 3/1906 | Lev | 293/125 |
| 1,665,085 | 4/1928 | Cunningham | 293/125 |
| 1,774,916 | 9/1930 | Doherty | 293/125 |
| 2,069,282 | 2/1937 | Silverman | 293/125 |
| 2,177,112 | 10/1939 | Johnstone | 293/49 |
| 2,245,746 | 6/1941 | Bang | 293/125 |
| 2,840,411 | 6/1958 | Mason | 293/125 |
| 3,322,916 | 5/1967 | Fisher | 293/49 |
| 4,068,877 | 1/1978 | Burleson | 293/125 |
| 4,213,645 | 7/1980 | Ruhl | 293/145 |
| 4,227,729 | 10/1980 | Schumacher | 293/145 |

FOREIGN PATENT DOCUMENTS

| | | | |
|---|---|---|---|
| 177335 | 1/1954 | Austria | 293/125 |
| 510632 | 3/1955 | Canada . | |
| 2321439 | 11/1973 | Germany | 293/125 |
| 288150 | 8/1931 | Italy | 293/125 |
| 491377 | 8/1938 | United Kingdom | 293/125 |

*Primary Examiner*—Dennis H. Pedder
*Attorney, Agent, or Firm*—Michael, Best and Friedrich

[57] ABSTRACT

A vehicle bumper ram guard assemblies for wheeled vehicles which are used to push other vehicles or objects. Each ram guard assembly comprising an upright elongate ram cylinder made of impact absorbent material and rotatably mounted on a U bracket which is in turn secured to the pushing vehicle's structure. Preferably the ram cylinder apart from being rotatable is also vertically movable so as to dissipate and minimize frictional forces on the object being pushed. A non-abrasive cover may cover the ram cylinder to further minimize frictional forces and consequent damage to the object being pushed.

13 Claims, 4 Drawing Sheets

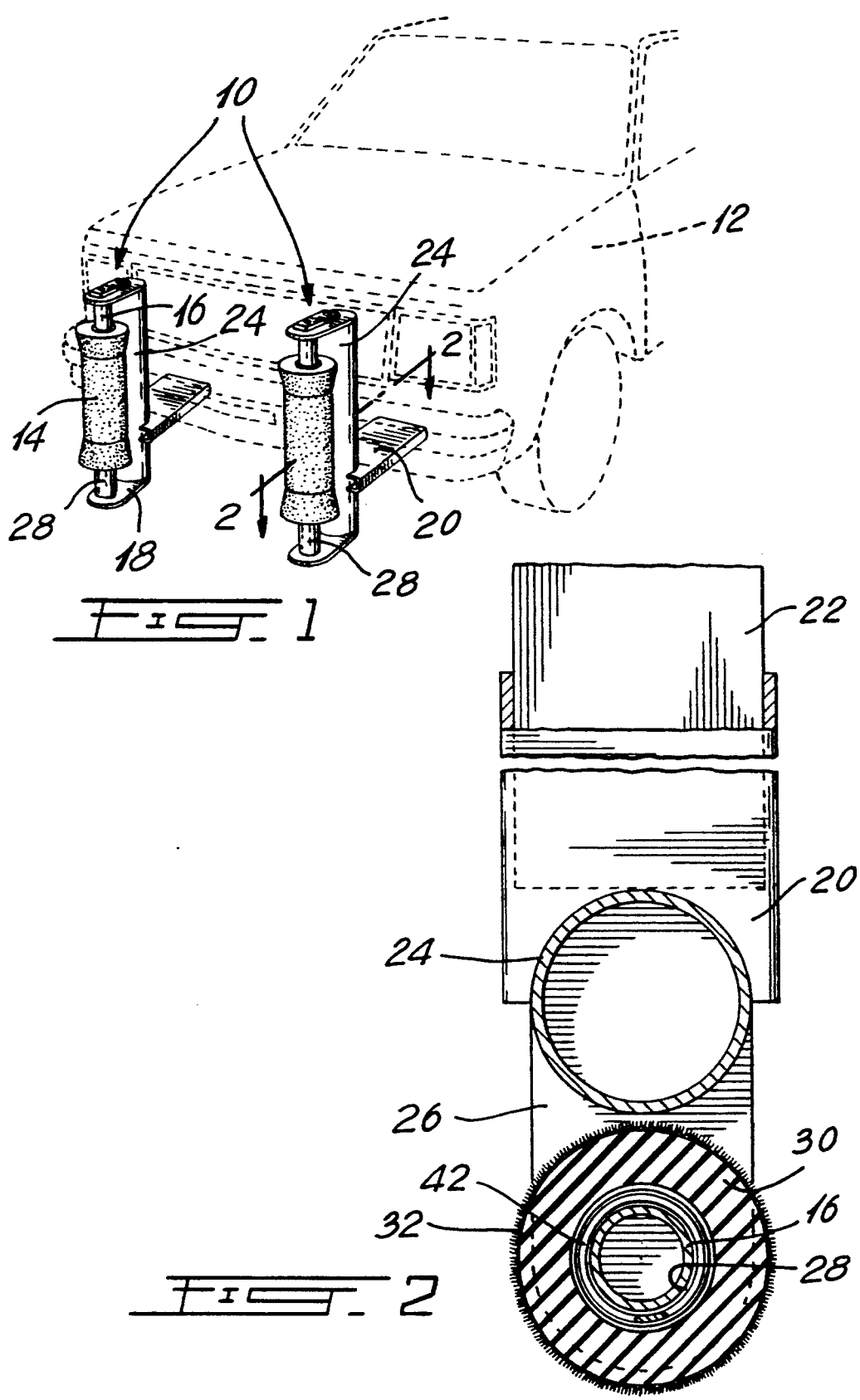

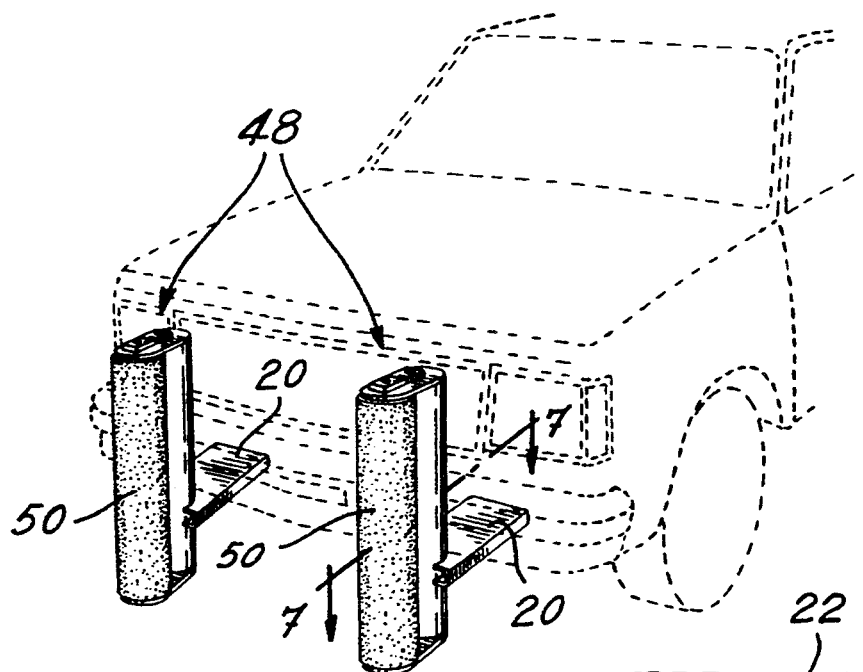
FIG. 6
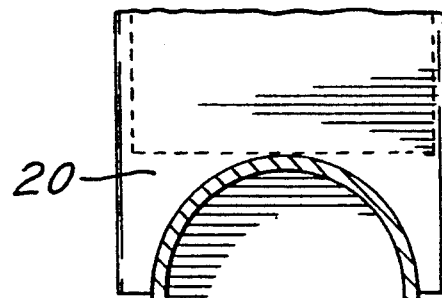
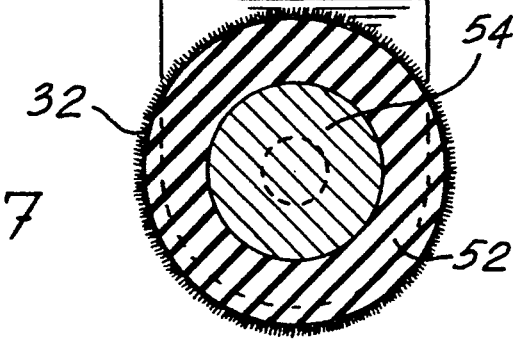
FIG. 7

RAM BAR ATTACHMENT FOR VEHICLE BUMPER

FIELD OF THE INVENTION

The present invention relates generally to vehicle accessories and more particularly to an improved vehicle bumper ram guard for wheeled vehicles which are used to push other vehicles or objects.

It will be appreciated that it is at times necessary to push disabled vehicles in the emergency caused by mechanical failure of the disabled vehicle. This is commonly accomplished by slowly approaching the front bumper assembly of the pushing vehicle towards the back bumper assembly of the disabled vehicle and pushing the latter over the roadway.

An important difficulty arises when practising this technique with late models cars, vans or trucks whose bumper assemblies can be easily damaged by impact or frictional forces during the pushing process. The problem is exacerbated in the case of painted urethane outer bumper skins which are often colour matched to the car body and generally exhibit highly finished surfaces. Abrasion on the bumper's finished outer surface is likely to occur during pushing thereby causing expensive damage to either the pushing or the disabled vehicle. Indeed, in the course of a pushing manoeuvre, the bumper assemblies of the pushing vehicle and the disabled vehicle will quickly rub against each other and cause damage to the outer surface of the bumpers when the vehicles travel over the inevitable inequalities found on the surface of the roadways. The vehicles suspension system absorb some inequalities of the roadways but will necessarily transmit some movement to the body of the vehicle including its bumper assembly. Further similar abrasion between the bumper assemblies will occur when the vehicles turn.

A similar and additional difficulty arises because the height from the ground of bumper assemblies for public roadway vehicles is not standardized. This inevitably leads to problems when one vehicle pushes a disabled vehicle whose bumper assembly is not horizontally aligned. It will be appreciated that in such cases bumper assemblies may overlap, interlock, and generally result in material damage to either the pushing or the disabled vehicle.

A further related difficulty arises because of the increasingly aerodynamic shaping of bumper assemblies. Most modern bumper assemblies now exhibit rounded surfaces which while protecting the occupants of the vehicle in case of an impact, do not lend themselves to pushing manoeuvre unless the other bumper assembly involved in the manoeuvre is at the same height from the ground. If this is not the case, rounded bumper assemblies will tend to ride up on each other and once again cause material damage.

The prior art has previously attempted to address part of the aforementioned difficulties. Canadian Patent 510,832 issued to Slotkin proposes a wood push-rack which clamps on the rear bumper assembly of a disabled vehicle to protect its rear bumper assembly during a pushing manoeuvre. In a proposed embodiment, the apparatus is stored in the boot of a car until the latter becomes disabled and pushing is necessary. To protect the bumper assembly of the disabled vehicle, the wood push-rack is to be clamped on its rear bumper assembly. Such apparatus is of course clearly not suitable or workable for late model cars having aerodynamic and highly finished bumper assemblies.

Ruhl in U.S. Patent proposes foamed plastic bumper guards which may be secured to an automobile bumper assembly to prevent damage in case of low velocity impacts. Once again this approach to the problem of bumper damage will not be feasible in the case of highly finished and aerodynamic bumper assemblies.

Accordingly, it is a primary object of this invention to provide an improved bumper ram guard assembly for mounting on a vehicle capable of pushing other vehicles or objects and which is adapted to absorb and diffuse impact and frictional forces on the object being pushed.

It is a further object of this invention to provide a ramming and pushing element which is shock absorbent and rotatable thereby minimizing impact and frictional damage to objects being pushed.

It is a further object of this invention to provide an improved bumper ram guard assembly for mounting on a vehicle which may be rapidly and easily removed from the vehicle when not in use.

Other objects and further scope of applicability of the present invention will become apparent from the detailed description given hereinafter. It should be understood, however, that this detailed description, while indicating preferred embodiments of the invention, is given by way of illustration only, since various changes and modifications within the spirit and scope of the invention will become apparent to those skilled in the art.

SUMMARY OF THE INVENTION

To achieve the above stated objects the present invention is directed to a vehicle ram guard for pushing another vehicle the ram guard being generally in the shape of an upright ram cylinder which is impact energy absorbent and rotatable about a inner shaft so that impact and frictional forces between the ram cylinder and the object being pushed will be minimized. The upright ram cylinder is rotatably mounted, on each longitudinal end of its longitudinal extremities, on a U bracket, said U bracket being fixedly mounted onto the pushing vehicle.

Preferably, the ram cylinder will also be longitudinally movable on the inner shaft so that frictional forces on the pushed object will be further minimized.

BRIEF DESCRIPTION OF THE DRAWINGS

FIG. 1 is a perspective view of a pair of bumper ram guard assemblies operatively mounted to the front of a vehicle shown in dotted lines;

FIG. 2 is a cross-sectional view taken at line 2—2 of FIG. 1;

FIG. 6 is a perspective view of an alternate embodiment of a pair of bumper ram guard assemblies;

FIG. 7 is a cross-sectional view taken at line 7—7 of FIG. 6.

DESCRIPTION OF PREFERRED EMBODIMENTS

Figure 3:
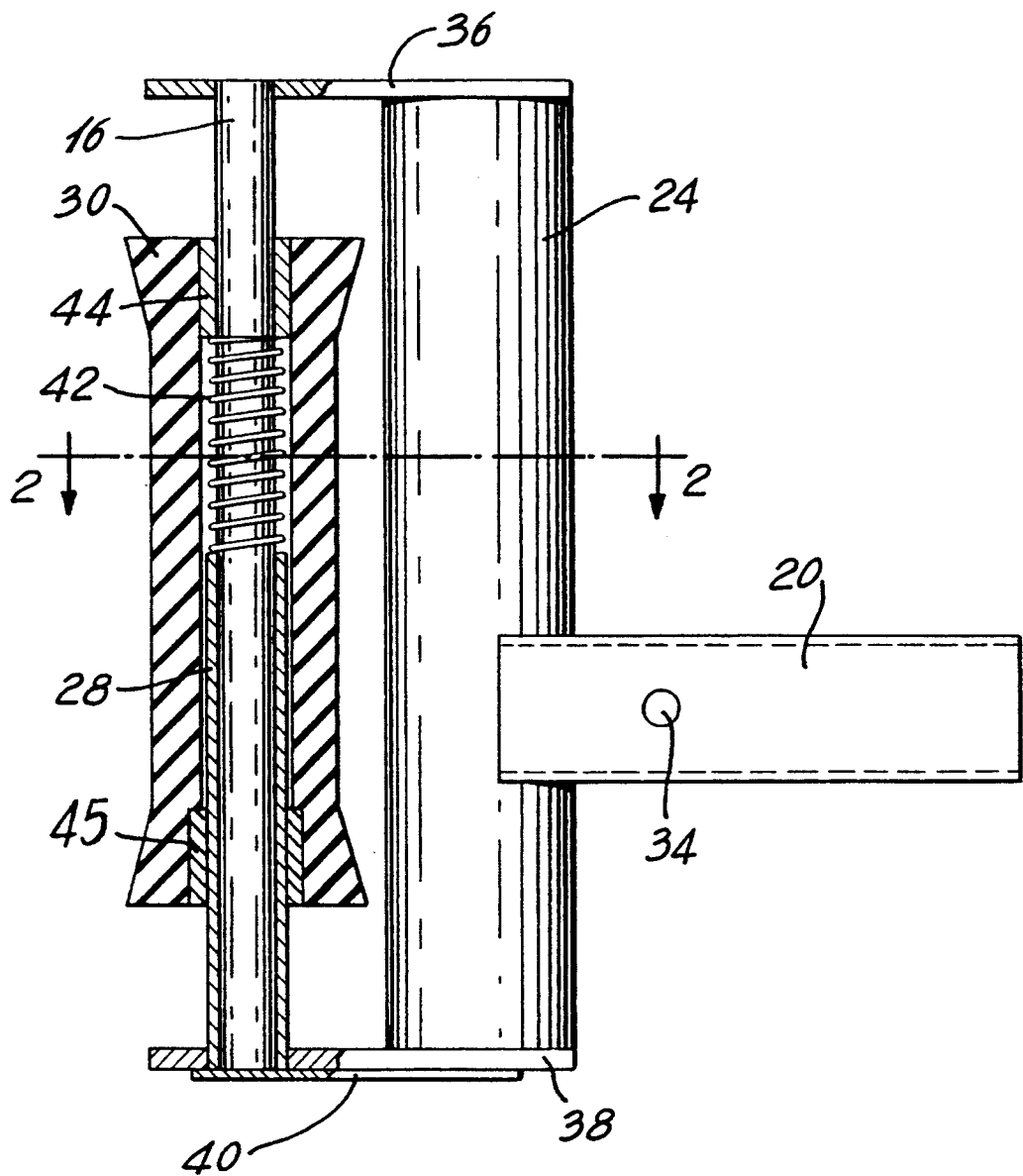
FIG. 3 is a partial cut-away side elevation of the bumper ram guard assembly shown in FIG. 1 with one side of the ram cylinder removed.

Referring now to FIGS. 1 and 2 there is shown in FIG. 1 a pair of ram guards 10 of the present invention mounted on a light truck 12 shown in dotted lines. Each ram guard 10 includes a ram cylinder 14 having generally frustroconical top and bottom extremities. The ram cylinder is rotatably mounted on inner shaft 16 at its top and on inner sleeve 28 at its bottom. Inner shaft 16 and inner sleeve 28 are fixedly mounted to U-bracket 18 which is provided with a backwardly projecting hollow support beam 20. In greater detail, U-bracket 18 comprises a tubular upright portion 24 and top and bottom legs 26. As seen in FIG. 2, the entire ram guard assembly 10 can be quickly installed on the host vehicle by inserting support flange 22 fixedly mounted to the host vehicle's chassis into hollow support beam 20 and securing such assembly with, for example, a retaining pin (not shown) inserted in hole 34 (shown in FIG. 3).

The ram cylinder 14 is preferably made of energy absorbent yet non permanently deformable material 30. Examples of such materials would be vulcanized rubber, and a wide variety of plastics and resins. The outer cover 32 of the ram cylinder 14 can advantageously exhibit a non abrasive material such as velour or foam.

Turning now to FIG. 3 there is shown a preferred embodiment of the present invention where the ram cylinder 14 is rotatable about its longitudinal axis as well as movable up and down, i.e., in the direction of its longitudinal axis. Ram cylinder 14 has a hollow core and is resiliently suspended on helicoidal spring 42 held in compression between rotation bearing 44 and tubular sleeve 28. Advantageously, rotation bearing 44 will be a TEFLON (trade-mark) rotation bearing. Tubular sleeve 28 is concentrically fitted over inner shaft 16. Inner shaft 16 is fixedly mounted on top plate 16 and is inserted through an aperture in bottom plate 38 and is retained in place together with sleeve 28 by bottom plate 40 fixedly secured to bottom plate 38. Ram cylinder 14 is also provided with a lower rotation bearing 45 rotatable on sleeve 28. By this arrangement, ram cylinder 14 is rotatable about its longitudinal axis and is also resiliently displaceable up and down inner shaft 16. Such an arrangement will tend to reduce frictional forces on objects being pushed by ram cylinder 14.

Figure 4:
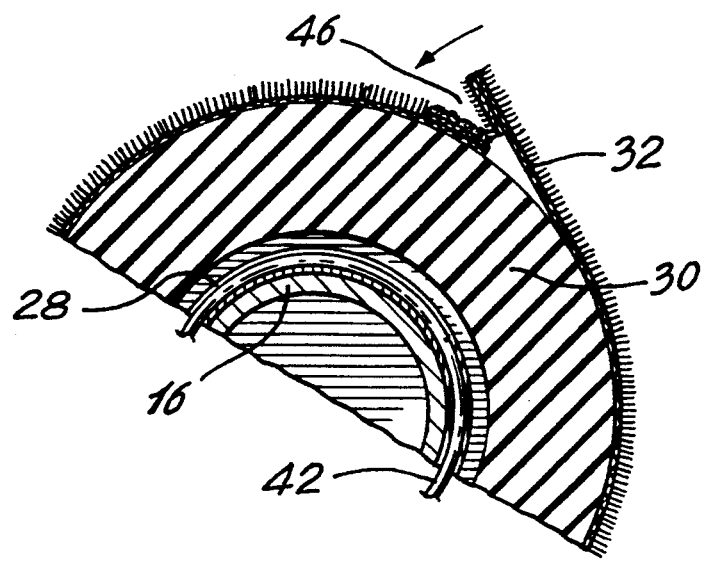
FIG. 4 is an isolated cross-sectional view taken at line 2—2 of FIG. 3.

Turning now to FIG. 4, outer cover 32 is shown during installation on ram cylinder material 30. Outer cover 32 is wrapped around ram cylinder material 30 and is secured in place with suitable means such as a Velcro (trade-mark) hook and loop fastening strip extending the entire width of outer cover 32.

Figure 5:
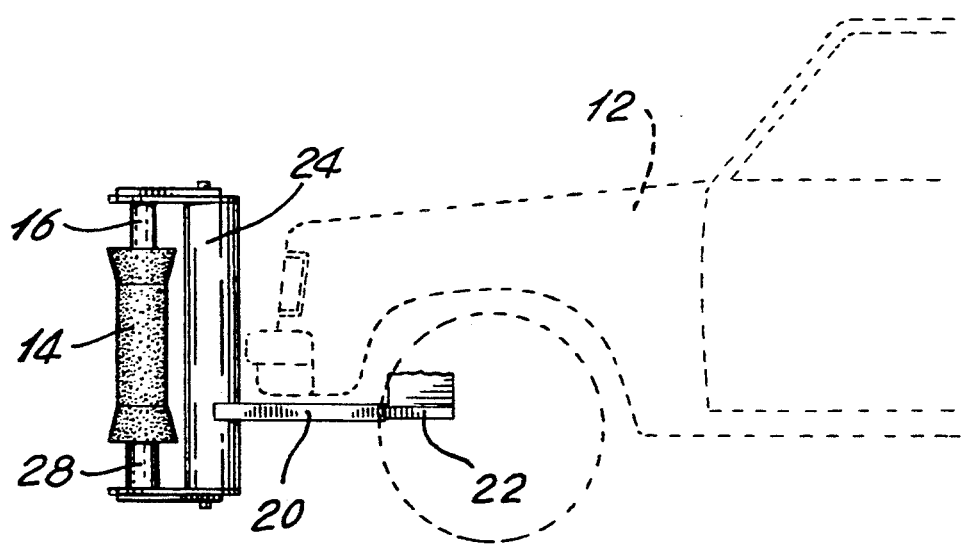
FIG. 5 is a side elevation of the bumper ram guard assembly shown mounted to the chassis portion of a vehicle.

FIG. 5 shows how ram guard 10 is mounted by sliding hollow beam 20 over support beam 22 which is fixedly mounted on the vehicle 12 chassis on other suitably strong part of the vehicle 12.

FIG. 6 and 7 show an alternate embodiment where ram guards 48 include ram cylinder 50 rotatable on inner shaft 54 but not movable up and down. Similarly to the previously described preferred embodiment, ram cylinder 50 includes an impact absorbent material 52 and preferably a soft outer cover 32.

Although the invention has been described above with respect with one specific form, it will be evident to a person skilled in the art that it may be modified and refined in various ways. It is therefore wished to have it understood that the present invention should not be limited in scope, except by the terms of the following claims.

The embodiments of the invention in which an exclusive property or privilege is claimed are defined as follows:

1. A motor vehicle ram guard assembly of the type wherein the ram guard assembly includes protective ram guards attachable to the front end of a pushing vehicle, each protective ram guard comprising:
   (a) bracket means including a framework attachable to the front end of the pushing vehicle and further including a U-shaped bracket having an upright portion and two essentially parallel arms adapted to receive a shaft therebetween in an essentially upright position;
   (b) a shaft for mounting rotatively a pushing element between said parallel arms of said U-shaped bracket;
   (c) a generally tubular pushing element having an axial bore adapted to receive said shaft, said pushing element being of a length shorter than said shaft; and
   (d) biasing means for resiliently maintaining said pushing element in a generally midpoint position between said parallel arms, said biasing means comprising an elastically deformable member mounted between said pushing element and the bracket means; whereby said pushing element is rotatively displaceable about said shaft and is resiliently displaceable in a direction parallel to said shaft between said parallel arms of said U-shaped bracket.

2. A vehicle ram guard assembly as in claim 1 wherein said biasing means is a helical spring.

3. A vehicle ram guard assembly as in claim 1 wherein said generally tubular pushing element comprises a middle cylindrical portion and two distal frustoconical portions tapering into the middle cylindrical portion.

4. A vehicle ram guard assembly as in claim 2 wherein said generally tubular pushing element comprises a middle cylindrical portion and two distal frustoconical portions tapering into the middle cylindrical portion.

5. A vehicle ram guard assembly as in claim 1 wherein said pushing element consists of a resilient material.

6. A vehicle ram guard assembly as in claim 1 wherein the outer surface of said pushing element comprises non-abrasive and resilient material.

7. A motor vehicle ram guard assembly of the type wherein the ram guard assembly includes protective ram guards attachable to the front end of a pushing vehicle, each protective ram guard comprising:
   (a) bracket means including a framework attachable to the front end of the pushing vehicle and further including a U-shaped bracket having an upright portion and two essentially parallel arms adapted to receive a shaft therebetween in an essentially upright position;
   (b) a shaft extending between and fixedly mounted to said parallel arms of said U-shaped bracket;
   (c) a shaft sleeve covering a portion of said shaft, having a proximate end fixedly mounted to one of said two parallel arms and a distal end remote from said one arm;
   (d) a generally tubular pushing element having an axial bore adapted to slidably receive said shaft and said shaft sleeve, said pushing element including first bearing means for mounting rotatively said pushing element onto said shaft on the portion of said shaft not covered by said shaft sleeve and including second bearing means for mounting rotatively said pushing element onto said shaft sleeve; and (e) biasing means placed in said axial bore of said pushing element and interposed between said first bearing means and said distal end of said shaft sleeve wherein said pushing element is resiliently displaceable in a generally vertical plane.

8. A vehicle ram guard assembly as in claim 7 wherein said biasing means is a helical spring.

9. A vehicle ram guard assembly as in claim 7 wherein said generally tubular pushing element comprises a middle cylindrical portion and two distal frusto-conical portions tapering into the middle cylindrical portion.

10. A vehicle ram guard assembly as in claim 8 wherein said generally tubular pushing element comprises a middle cylindrical portion and two distal frusto-conical portions tapering into the middle cylindrical portion.

11. A vehicle ram guard assembly as in claim 7 wherein said pushing element consists of a resilient material.

12. A vehicle ram guard assembly as in claim 7 wherein the outer surface of said pushing element comprises non-abrasive and resilient material.

13. A motor vehicle ram guard assembly comprising:

(a) bracket means including a framework attachable to the front end of a pushing vehicle and further including a U-shaped bracket having an upright portion and two essentially parallel arms adapted to receive a shaft therebetween in a substantially upright position;

(b) a shaft extending between and fixedly mounted to said parallel arms of said U-shaped bracket;

(c) a shaft sleeve covering a portion of said shaft, having a proximate end fixedly mounted to one of said two parallel arms and a distal end remote from said one arm;

(d) a generally tubular pushing element having an axial bore slidably receiving said shaft and said shaft sleeve, said pushing element including an exterior surface comprising non-abrasive and resilient material having a middle vertically extending cylindrical portion and having two distal frustroconical portions tapering into the middle cylindrical portion;

(e) first bearing means for mounting rotatively said pushing element onto said shaft on the portion of said shaft not covered by said shaft sleeve;

(f) second bearing means for mounting rotatively said pushing element onto said shaft sleeve; and (g) a spring placed in said axial bore of said pushing element and interposed between said first bearing means and said distal end of said shaft sleeve.

* * * * *